Figure 1:
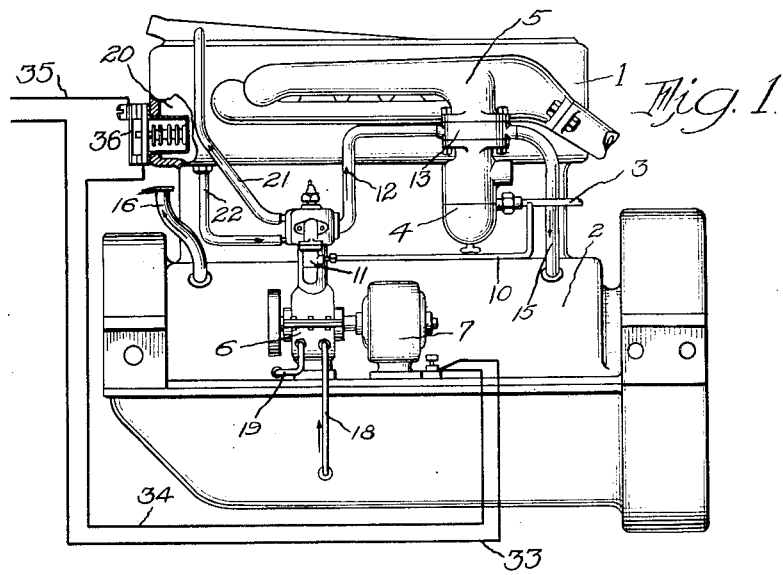

J. M. LEA.
POWER PLANT.
APPLICATION FILED AUG. 8, 1919.

1,409,736.

Patented Mar. 14, 1922.

WITNESS:

INVENTOR
JOHN M. LEA
BY
ATTORNEYS

UNITED STATES PATENT OFFICE.

JOHN M. LEA, OF DETROIT, MICHIGAN, ASSIGNOR TO GENERAL MOTORS CORPORATION, OF DETROIT, MICHIGAN, A CORPORATION OF DELAWARE.

POWER PLANT.

1,409,736.   Specification of Letters Patent.   Patented Mar. 14, 1922.

Application filed August 8, 1919. Serial No. 316,172.

*To all whom it may concern:*

Be it known that I, JOHN M. LEA, a citizen of the United States, residing at Detroit, in the county of Wayne and State of Michigan, have invented new and useful Improvements in Power Plants, of which the following is a specification.

Ordinary motor car practice, as is a matter of common knowledge, results in a series or complication of difficulties centered around battery maintenance, cranking carburetion and getting underway in cold weather.

The batteries are usually either overcharged or undercharged, resulting both in inefficiency in the associated apparatus and in destruction of the battery itself by warping and breaking the material away from the grids or by sulfation; moreover, the charging rate is usually so great as to cause heating of the battery with resultant evaporation of the liquid when continued after full charge, and this in practice renders it necessary to refill the battery with water at intervals of every two or three weeks.

Again, due to the inability to secure sufficiently volatile grades of fuel, it is becoming more difficult from year to year to start the engine and, as a consequence, more energy is being drawn from the battery to drive the starter, the ordinary system demanding, on account of the initially cool condition of the engine, a large amount of energy for starting even when the better grades of fuel are available—a condition which is, of course, greatly accentuated during cold weather. Joined to this is the ever present danger of freezing and splitting of the cylinder casting and associated parts. This last mentioned condition has led to many schemes for heating the engines, by the use of burners, torches and the like, none of which, to my knowledge, has proven commercial or satisfactory.

These various difficulties and others I overcome by the present invention, in accordance with which I associate with and preferably mount upon the usual internal combustion engine another small or auxiliary engine of the same class, and utilize the latter to both heat the former and to charge the battery, preferably by controlled means, to keep the battery in proper charged condition. I believe that I am the first to adopt any installation working on the general principle outlined above, and I am of course aware that the details of the engines, the electrical apparatus, and the interconnecting elements which go to make up the commercial apparatus are subject to wide variation.

However, in order to simplify the construction and reduce the cost I prefer to utilize as much of the equipment of the existing engine as possible also as equipment for the auxiliary engine, and for this purpose I preferably so arrange the parts that the water jacket, oil system, and fuel supply of the auxiliary engine are interconnected, respectively, with the cooling system, lubricating system and fuel supply of the main engine. I also preferably pass the exhaust gas from the auxiliary engine in proximity to the intake manifold, carbureter, or equivalent part of the main engine to thereby insure vaporization of the fuel supply for the latter under most favorable circumstances; I likewise preferably pass the exhaust from the auxiliary engine through the crankcase of the main engine to thus accomplish the double function of keeping the oiling system warm and of muffling the auxiliary engine exhaust.

By proceeding in this general manner, an exceedingly efficient unit is formed, the output of the auxiliary engine being absorbed by the battery, whereas its normal heat losses are absorbed by the main engine and tend to keep the latter above a pre-determined temperature. Moreover, the auxiliary engine forms an exceedingly efficient burner as the fuel is fired under compression; it also has the advantage of being fireproof. Thus the main engine is kept warm, will crank immediately, and full power will be available on the get-away, whether in cold or warm weather.

As stated above, the small auxiliary engine is utilized also to charge the battery and for this purpose I preferably associate therewith a small generator whereby the charging current is supplied to the battery at a low rate as distinguished from the ordinary practice wherein the current is rapidly supplied from a generator of large capacity. Thus the charging may take place regardless of whether the main engine is running or not, and the rate of charging is such that the battery does not become overheated.

Again, while the generator might be made small enough so that it might run constantly, and while I prefer this arrangement under certain conditions, I generally prefer to build it of somewhat over capacity and associate with it suitable control means whereby it is automatically set in operation and automatically cut out of operation when the voltage of the battery attains predetermined low and high values; and I also prefer to provide the control means with some device whereby the generator is automatically set in operation to start the engine when the environment temperature or the temperature of some essential or vulnerable part of the system falls to a predetermined degree.

It will now be understood that the invention has two leading objects,—

1st. To avoid the troubles incident to the battery as used in the ordinary practice, and thereby materially prolong its active life, and 2nd. To insure proper starting and getaway power of the traction or propelling engine and proper carburetion under all circumstances.

Another object is to simplify the installation as a whole by utilizing in so far as possible the necessary auxiliary devices or apparatus of the main engine for like purposes in connection with the auxiliary engine.

Figure 2:
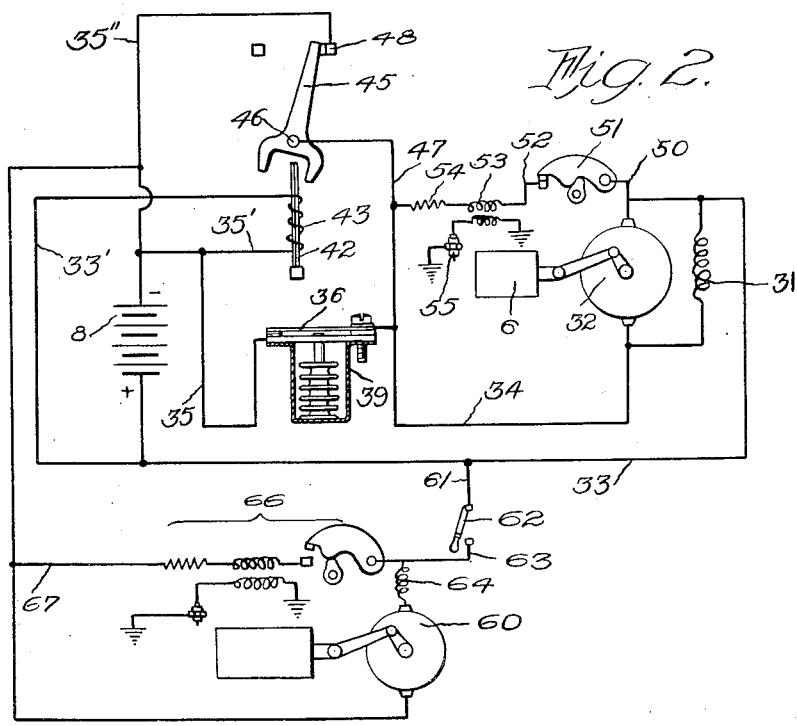

In the drawings, Fig. 1 is a side elevation showing a preferred embodiment of the invention, parts being broken away. Fig. 2 shows the minimum temperature and voltage controls of the generator circuit of the auxiliary engine, together with its ignition circuit and the starter and ignition circuits for the main engine.

An ordinary internal combustion engine, such as those used as the power plants of motor vehicles, is shown to illustrate a preferred application of the invention, the usual cylinder block and crankcase being designated 1 and 2, respectively. This main engine is supplied with fuel through the medium of the pipe 3, carbureter 4 and intake 5. A small or miniature internal combustion engine 6 and generator motor 7 are associated with the main engine 1—2, preferably by being mounted rigidly on the crank casing, said engine and generator preferably being directly connected so that when the generator is driven as a motor with current from the battery 8 it will crank the engine which will thereupon drive the generator to supply current to the battery. It will be understood that the battery 8 supplies energy to the usual starter motor for the main engine, and to the lights and other electrical equipment for the vehicle or other installation of which the engine forms the power plant.

As is indicated in Fig. 1, fuel is preferably supplied to the auxiliary engine from the pipe 3 by means of the pipe 10 and carbureter 11; and the exhaust of the auxiliary engine is passed in close proximity to the intake 5 to heat the incoming gaseous mixture, this being accomplished, in the connection shown, by means of the pipe 12 and hollow heater or stove 13 interposed between the carbureter 4 and manifold 5. From the heater 13, the exhaust is preferably passed through the pipe 15 to the interior of the crank case which it heats and from which it escapes through a breather or outlet, pipe 16, it being understood that the crankcase thus acts as a muffler.

Again, by tapping into the base of the crankcase 2 from the engine 6, as by means of a pipe 18, it is evident that lubricating oil may be drawn to the auxiliary engine and distributed to the various moving parts thereof, and returned to the sump through an overflow pipe 19 or in the ordinary way; and, in like manner, I preferably connect the water jacket of the engine 6 to the water jacket 20 or cooling system of the main engine, as by means of the intake pipe 21 and outlet pipe 22 through which the cooling liquid flows in the direction of the arrows, thereby both cooling the auxiliary engine 6 and heating the various elements of the cooling system of the main engine to thereby maintain the cylinders and passages at a temperature favorable to combustion.

Various devices may be utilized for controlling the operation of the engine in accordance with the temperature: as indicated in Fig. 2, the battery 8 may be connected to the field 31 and armature 32 of the generator 7 by means of the conductors 33, 34 and 35, a suitable thermostatically operated switch 36 being interposed between the elements 34 and 35 to complete the circuit when the temperature falls to a predetermined minimum. This switch may be positioned at any vulnerable point in the power unit, say in the water jacket 20, Fig. 1, and for this purpose may be carried in a housing 39.

In like manner, the apparatus for controlling the operation of the generator in accordance with the battery voltage is subject to wide modification, one inexpensive and easily constructed device comprising a thermostat 42 having a high resistance winding 43 connected across the terminals of the battery by means of the conductors 33'—35' so that the thermostat is heated more or less depending on the voltage of the battery. A switch 45, preferably of a suitable quick-break type, is diagrammatically shown as being pivoted at 46 and arranged to be thrown over clockwise to complete the circuit 47—45—48—35" when a sufficient fall in the voltage causes the thermostat to approach the limit of its swinging movement toward the left, whereupon the generator 7 cranks the engine 6 to start the latter. The engine, thus starting, drives the generator motor 32 as a generator to feed the battery and continues to run until the rise in battery voltage causes the free end of the thermostat 42 to reach the limit of its movement to the right to thereby throw the switch counter-clockwise to break the circuit and shut down the engine. In order to insure this latter action, the primary ignition circuit consisting of the conductor 50, breaker 51, conductor 52, primary coil 53 and resistance 54, whereby energy is supplied to the spark plug 55, is so arranged as to be under control of both the switch 45 and the switch 36. Other control apparatus might, of course, be used in lieu of that shown.

The engine 6, being capable of but a small output,—say one-sixtieth to one-thirtieth horse-power, for example, and the generator-motor 7 being of corresponding capacity,—say six to ten watts, in the case of automobile service, it is evident that the battery 8 will be very slowly charged and that its voltage may be kept within narrow limits; also that the output of the engine 6 is efficiently utilized to provide sufficient energy for cranking the main engine by the usual motor 60 and for lighting. Straining and separation of the material from the grids through overcharge, sulfation through undercharge, and evaporation of the liquid through overheating is avoided. The otherwise large heat losses of the auxiliary engine are, moreover, for the most part made use of in heating the larger engine, thus keeping the latter constantly at a temperature such that both starting and get-away are easy and require a minimum expenditure of energy.

As an example of the various ways of connecting the starter motor 60 for the main engine to the battery, I have shown the conductor 61, hand switch 62, conductor 63, field winding 64, motor armature, ignition apparatus 66 and conductor 67, Fig. 2, it being understood that the motor is connected to the engine shaft by some sort of an over-running clutch or the equivalent, as is the ordinary practice.

As stated heretofore, the actual construction may be widely different from that shown. I regard myself as the first to adopt the broad principles on which the apparatus depends, and do not wish to be limited except as indicated by the subjoined claims.

In this connection it will be seen that inasmuch as the operation of the ignition system of the main engine is dependent on the battery, and inasmuch as the voltage of the latter is dependent on the auxiliary engine, said auxiliary engine is an inherent part of the power plant as a whole, as distinguished from the ordinary oil burners, stoves or other accessories which have been employed heretofore for heating the engine.

I claim:—

1. In combination with an internal combustion engine and an associated battery, a relatively small auxiliary internal combustion engine mounted on the first named engine and having its cooling system interconnected with the cooling system of the first named engine to heat the latter, and an electrical machine driven by the auxiliary engine to charge the battery.

2. In combination with an internal combustion engine, an electric starting apparatus for said engine, said aparatus constituting the sole starting means for said engine, and a battery for supplying current to said apparatus, a relatively small internal combustion engine arranged to heat the first mentioned engine, and an electrical machine driven by said auxiliary engine to charge the battery and in turn operated by current from said battery to start said auxiliary engine, and means, dependent for its operation on the condition of said battery, for automatically starting and stopping said auxiliary engine by said electrical machine.

3. In combination with an internal combustion engine, an electric starting apparatus for said engine, and a battery for supplying current to said apparatus, a relatively small internal combustion engine, and an electrical machine driven by said auxiliary engine to charge the battery at a low rate and itself arranged to start said auxiliary engine by current from said battery, thermally controlled means for initiating the starting of said auxiliary engine by said machine, and means, dependent on the condition of the battery, for stopping said machine when the battery is properly charged.

4. In combination with an internal combustion engine having a crank casing, a relatively small internal combustion engine having an exhaust passage leading to said crank casing, whereby the auxiliary engine, in operating, heats the first named engine.

5. In combination with an internal combustion engine and a battery therefor, a relatively small auxiliary internal combustion engine associated with the first named engine to heat the latter, and a generator-motor adapted to start the auxiliary engine and to thereafter be driven by said auxiliary engine to charge the battery.

6. In combination with an internal combustion engine, a relatively small internal combustion engine associated therewith and adapted to heat the first named engine, and a thermally controlled device for initiating the operation of the auxiliary engine.

7. In combination with an internal combustion engine, a battery on which the operation of said engine depends, a relatively small auxiliary internal combustion engine, an electrical apparatus asociated with the auxiliary engine and adapted to charge the battery, and voltage controlled apparatus for initiating the operation of the auxiliary engine when the voltage of the battery falls to a predetermined minimum.

8. In combination with an internal combustion engine, a battery on which the operation of said engine depends, a relatively small auxiliary internal combustion engine, an electrical apparatus associated with the auxiliary engine and adapted to charge the battery, and voltage controlled apparatus for interrupting the operation of the auxiliary engine when the voltage of the battery rises to a predetermined maximum.

9. In combination with an internal combustion engine and the oiling system thereof, an auxiliary internal combustion engine adapted to act as a heater for the first named engine and having an oiling system interconnected with that of said first named engine.

10. In combination with a relatively large internal combustion engine having a crank casing, a relatively small internal combustion engine associated with said large engine, said small engine exhausting through said crank casing, whereby the casing acts as a muffler therefor.

11. Apparatus of the type set forth comprising a relatively large engine and a relatively small engine, an electric starter for the large engine, a battery supplying current to said starter, a generator constituting the load of the small engine and arranged to charge the battery at a slow rate, and means for recovering a large measure of the heat from the exhaust of the small engine and for applying it to maintain the larger engine at a temperature favorable to the vaporization of hydro-carbon fuel.

12. Apparatus of the type set forth comprising two engines of the internal combustion liquid cooled type, thermally controlled means for starting one of said engines, and means for recovering a large measure of heat from the cooling system of said last named engine and for applying it to the cooling system of the other engine to maintain said other engine at a temperature favorable to the vaporization of hydro-carbon fuel.

13. In combination with an internal combustion engine, a relatively small internal combustion engine associated therewith and adapted to heat the first named engine, a thermally controlled device for initiating the operation of the auxiliary engine at a predetermined low temperature, a battery on which the operation of the first named engine depends, electrical apparatus associated with the small engine and adopted to charge the battery, and voltage controlled apparatus for initiating the operation of the small engine when the voltage of the battery falls to a pre-determined minimum.

14. A self heating power plant comprising a plurality of internal combustion engines and thermally controlled means for automatically setting one of said engines in operation to heat another of said engines to thereby maintain the latter above a predetermined temperature.

In testimony whereof I affix my signature.

JOHN M. LEA.